United States Patent
Bell et al.

(10) Patent No.: US 6,297,293 B1
(45) Date of Patent: Oct. 2, 2001

(54) MESOPOROUS CARBONS AND POLYMERS

(75) Inventors: William Bell, Boulder; Steven Dietz, Denver, both of CO (US)

(73) Assignee: TDA Research, Inc., Wheat Ridge, CO (US)

( * ) Notice: Subject to any disclaimer, the term of this patent is extended or adjusted under 35 U.S.C. 154(b) by 0 days.

(21) Appl. No.: 09/396,288

(22) Filed: Sep. 15, 1999

(51) Int. Cl.⁷ .................................................. C08J 9/28

(52) U.S. Cl. ........................ 521/99; 521/63; 521/64; 521/77; 423/445 R; 423/449.6

(58) Field of Search ................................. 521/61, 63, 64, 521/77, 99; 423/445 R, 449.6

(56) References Cited

U.S. PATENT DOCUMENTS

| | | | |
|---|---|---|---|
| 3,875,270 | 4/1975 | Haefner et al. | 264/6 |
| 4,594,287 | * 6/1986 | Hucke | 528/320.2 |
| 4,756,898 | 7/1988 | Hopper et al. | 423/449 |
| 4,806,290 | 2/1989 | Hopper et al. | 264/28 |
| 4,843,103 | 6/1989 | Albertelli et al. | 521/83 |
| 4,873,218 | 10/1989 | Pekala | 502/64 |
| 4,997,804 | 3/1991 | Pekala | 502/418 |
| 5,081,163 | 1/1992 | Pekala | 521/187 |
| 5,086,085 | 2/1992 | Pekala | 521/187 |
| 5,250,576 | 10/1993 | Des Marais et al. | 521/63 |
| 5,318,797 | 6/1994 | Matijevic et al. | 427/213.31 |
| 5,402,306 | 3/1995 | Mayer et al. | 361/502 |
| 5,476,878 | 12/1995 | Pekala | 521/61 |
| 5,556,892 | 9/1996 | Pekala | 521/181 |
| 5,792,945 | 8/1998 | Murakami | 73/64.48 |
| 5,863,958 | 1/1999 | Dyer et al. | 521/63 |
| 5,908,896 | * 6/1999 | Mayer et al. | 524/596 |
| 5,925,408 | 7/1999 | Tan | 427/228 |
| 5,993,996 | 11/1999 | Firsich | 429/231.8 |
| 6,024,899 | * 2/2000 | Peng et al. | 264/29.1 |
| 6,031,711 | 2/2000 | Tennent et al. | 361/303 |
| 6,121,336 | 9/2000 | Okoroafor et al. | 521/112 |

OTHER PUBLICATIONS

A. Monnier, et al; Cooperative Formation of Inorganic–Organic Interfaces on the Synthesis of Silicate Mesostructures; Science, vol. 261, Sep. 3, 1993 (pp. 1299–1303).

John M. Thomas; The Chemistry of Crystalline Sponges; Nature, vol. 368, Mar. 24, 1994 (pp. 367–368).

Olsheng Huo, et al; Generalized Synthesis of Periodic Surfactant/Inorganic Composite Materials; Nature, vol. 368, Mar. 24, 1994; (pp. 317–319).

C. T. Kresge, et al; Ordered Mesoporous Molecular Sieves Synthesized by a Liquid–Crystal Template Mechanism; Nature, vol. 359, Oct. 22, 1992; (pp. 710–712).

William R. Even, Jr., et al Emulsion–Derived Foams: Preparation, Properties, and Applications; Mrs Bulletin Apr. 1994; (pp. 29–33).

J. S. Beck; Molecular or Supramolecular Templating Defining the Role of Surfactant Chemistry in the Formation of Microporous and Mesoporous Molecular Sieves; American Chemical Society; Chem. Mater. vol. 6, No. 10, 1994; (pp. 1816–1821).

R. R. Lagasse, et al; High Surface Area, High Permeability Carbon Monoliths; Organic Materials Processing Dept., Sandia National Laboratories, Albuquerque, NM; 1994; (pp. 7).

J. D. LeMay, et al; Low–Density Microcellular Materials; MRS Bulletin/ Dec. 1990; (pp. 19–45).

(List continued on next page.)

Primary Examiner—James J. Seidleck
Assistant Examiner—Melanie D. Bagwell (57) ABSTRACT

A mesoporous material prepared by polymerizing a resorcinol/formaldehyde system from an aqueous solution containing resorcinol, formaldehyde and a surfactant and optionally pyrolyzing the polymer to form a primarily carbonaceous solid. The material has an average pore size between 4 and 75 nm and is suitable for use in liquid-phase surface limited applications, including sorbent, catalytic, and electrical applications.

15 Claims, 6 Drawing Sheets

OTHER PUBLICATIONS

R. W. Pekala, et al; Carbon Aerogels: An Update on Structure, Properties, and Applications; Lawrence Livermore National Laboratory; 1994; (pp. 369–377).

R. W. Pekala, et al; Aerogels Derived From Multifunctional Organic Monomers; Elsevier Science Publication B.V. 0022–3093 1992 (pp. 90–98).

D. Myers; Surfactant Science and Technology; VCH Publishers; 1846; (pp. 172–177).

V. Luca, et al; Synthesis and Characterization of Mesostructured Vanadium Oxide; American Chemical Society, 1995; Chem. Mater. 1995, (pp. 2220–2223).

S. Bagshaw, et al; Templating of Mesoporous Molecular Sieves by Nonionic Polyethylene Oxide Surfactants; Science, vol. 269, Sep. 1, 1995; (pp. 1242–1244).

J. S. Beck, et al; A New Family of Mesoporous Molecular Sieves Prepared with Liquid Crystal Templates; J. Am. Chem. Soc. 1992; (pp. 10834–10843).

* cited by examiner

Figure 1

Structure of RF polymer.

Figure 2

Nitrogen isotherm of formulation 17.
Solid circle = desorption. Empty circle = adsorption

Figure 3

Nitrogen Pore size distribution for formulation 17.

Figure 4

Polymer formation on the micelle surface

Figure 5

Before Activation      After Activation

Representation of the change in the structure
of a porous carbon before and after activation.

Figure 6

Micropore size distribution of present RF mesoporous carbons before and after activation with carbon dioxide.

Figure 7

Plot of gravimetric capacitance vs. pore diameter
for the mesoporous carbons using 4 M KOH electrolyte.

Figure 8

Schematic discharge curve of an ultracapacitor.

Figure 9

Schematic of ultracapacitor device.

Figure 10

MESOPOROUS CARBONS AND POLYMERS

STATEMENT REGARDING FEDERALLY SPONSORED RESEARCH OR DEVELOPMENT

This work was funded in part by the National Science Foundation, Contract No. DMI-9760320, Department of Energy, Contract No. DE-FG03-96ER82290/M001, and Department of Energy, Contract No. DE-FG03-92-ER81320.

CROSS-REFERENCE TO RELATED APPLICATIONS

Not applicable.

TECHNICAL FIELD OF THE INVENTION

The present invention relates generally to mesoporous organic polymers and more particularly to mesoporous carbon structures that are particularly useful as catalyst supports, sorbents, and electrodes.

BACKGROUND OF THE INVENTION

Mesoporous Materials

Materials whose structures allow fluids to flow through the materials are porous. Porous materials can be characterized by their pore sizes. Very small pores having diameters <2 nm are called micropores, while very large pores (>50 nm) are called macropores. Most high surface area carbons, such as activated carbons, are primarily microporous, and have pores that are too small to be readily accessible to liquids. Pores of intermediate size (between 2 and 50 nm) are called mesopores and form the subject of the present invention. One aspect of mesopores is that they have pores that are large enough to readily allow liquids to enter the material. At the same time, large pores do not provide as much surface area in a given volume of material as do smaller pores. Thus, mesoporous materials provide liquid access to more surface area per unit volume of material than either microporous or macroporous materials. As used herein the term "mesopore" will be used to refer to pores in the desired size range, namely to pores having diameters between approximately 2 and 50 nm.

Uses for Mesoporous Materials

Because of their large liquid-accessible surface areas, mesoporous materials are useful in many liquid phase applications, including as sorbents, electrical materials and catalyst supports. For example, catalytic reactions are typically surface reactions, i.e. the surface of the catalyst serves as an active site for the combination or separation of reactive species. The larger the surface area of catalyst, the more active sites there will be and the more rapidly the catalyzed reaction will proceed. Catalytic reactions can occur in the gas or liquid phase; in either case, it is desirable to maximize the amount of catalyst surface area. One common way to do this is to provide the catalyst as a thin coating on the surface of a support material. The support material provides the structure for the catalyst and thus determines its shape and the amount of surface area per unit volume. Hence, the porosity and surface area of the support become rate-limiting factors. Mesoporous materials provide optimal support structures for certain catalytic systems.

Similarly, pore size is an important aspect of sorbent technology. Sorption typically involves a solid phase (the sorbent) and a liquid or gas phase. The liquid phase can comprise a solvent containing a dissolved species to be sorbed, or an emulsion or other mixture of two liquids, one of which is to be sorbed. Examples of common sorbent applications currently include polymers and carbons in powdered, granular, and pelletized form for environmental applications associated with energy production, by-product recoveries, and waste incineration, as well as water purification and wastewater cleanup. An example of a sorbent application that involves a gas phase is air purification. A variety of other uses are known or are being developed. For each desired application, the sorbent is selected such that the sorbent has an affinity for the sorbate species, so that it is attracted into the solid and held there by one of various surface mechanisms. The efficacy of a sorbent material depends on how much sorbate it can attract and retain. Hence, the pore size and available surface area are critical in this context as well.

Similarly, certain electrical applications involve liquid phase, surface-limited reactions. One example of such an application is an ultracapacitor. Like batteries, ultracapacitors are energy storage devices. Ultracapacitors are notable for their ability to store and deliver energy at high power densities, and to be cycled virtually indefinitely without degradation. In contrast, batteries store large amounts of energy, but function most efficiently at low power densities and degrade quickly if they are deeply cycled. The characteristics of ultracapacitors make them particularly suitable to meet the power requirements of various emerging technologies, including electric vehicles, electronics (cellular telephones, and digital communications) and clean power (uninterrupted power sources, filters, etc.).

An ultracapacitor typically comprises a pair of electrodes separated by a non-conductive porous separator. The space between the electrodes is filled with a liquid electrolyte, which can be aqueous or organic-based. Because there are no chemical reactions taking place during the charge/discharge cycle, capacitors can be cycled many times without degradation, unlike batteries. However, previously known ultracapacitors lacked sufficient energy storage capacity to make them commercially practical. One key to improving the energy storage capacity of ultracapacitors is to optimize the interaction between the electrodes and the electrolyte.

There are two major categories of electrolytes for double layer devices: aqueous and organic, each of which has advantages and disadvantages. Aqueous electrolytes such as potassium hydroxide and sulfuric acid have low resistance (0.2 to 0.5 ohms/cm$^2$) and can be charged and discharged very quickly. However, they can only be cycled through a potential range of one volt due to the voltage limits of aqueous electrolytes; this sharply limits their energy storage density (which is proportional to voltage squared). Organic electrolytes such as propylene carbonate have much higher breakdown voltages (up to three volts) and therefore have much greater energy storage densities (in theory, by a factor of nine). However, because they have much higher resistance (1–2 ohms/cm$^2$), they cannot be cycled as quickly. The type of electrolyte that is desirable depends on the nature of the application.

Figure 1:
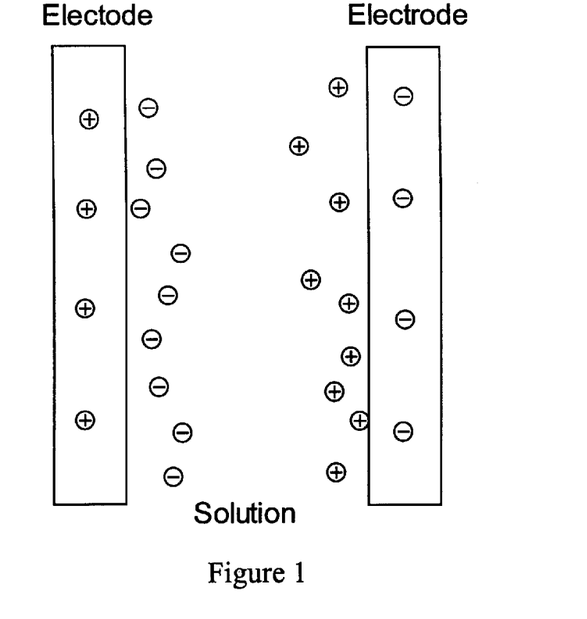
FIG. 1 is an illustration of a charged double layer at a solid/liquid/solid interface.

The mechanism for energy storage devices of this type is based on the double-layer capacitance at a solid/solution interface. More specifically, double-layer ultracapacitors typically consist of high surface area carbon structures that store energy in a polarized liquid layer. The polarized liquid layer forms at the interface between an ionically conducting liquid electrolyte and an electronically conducting electrode, namely the carbon structure. As illustrated in FIG. 1, the separation of charge in the ionic species at the interface (called a double layer) produces a standing electric field. Thus, the capacitive layer, while only a few angstroms thick, has a very is large area. The larger the area of the interface is, the more energy can be stored. Hence, the capacitance of this type of capacitor is proportional to the surface area of the electrode.

At the same time, electrodes having pores smaller than about 2 nm do not exhibit increased capacitance. It is believed that pores smaller than about 2 nm are too small to allow entry of most nonaqueous electrolytes and therefore cannot be fully wetted, with the result that a portion of the potential interface area is not realized. Hence, it is believed that mesoporous materials are optimal for use in this type of capacitor.

While some carbon structures having pore sizes in the mesoporous range have been extensively investigated for use in ultracapacitors because of their low cost and potential for high-energy storage densities, none of them have proved entirely satisfactory. Since the capacitance of the material increases linearly with the specific surface area, a carbon material with a capacitance of 20 $\mu F/cm^2$ and a surface area of 1000 $M^2/g$ would have a capacitance of 200 F/g if all of the surface were electrochemically accessible. However, since high surface area porous carbons typically have a high fraction of micropores, only a fraction of the surface of the carbon is effectively utilized (wetted); most of the surface therefore does not contribute to the double-layer capacitance of the electrode and the measured capacitance values of prior carbon structures are therefore only about 20% of theoretical. For carbon-based ultracapacitors to approach their theoretical performance, they should have a high pore volume (>50%) and a high fraction of continuous pores with diameters of greater than 2 nm to allow the electrolyte access to the carbon surface.

In sum, the major drawbacks of the carbons now used in double-layer ultracapacitors are: low capacitance (due to pores that are too large or too small), low density (which increases the size of the ultracapacitor), and high costs (due to materials and processing costs).

In addition, the electrical conductivity low conductivity (due to resistance at particle/particle interfaces) of the electrode itself affects the efficiency of the capacitor. Thus, for ultracapacitor electrodes, monolithic carbon is more desirable than particulate carbons or compacts of particulate carbon, which have high surface areas, but which suffer from high internal resistance because of the particle-particle interfaces.

Another example where a monolithic polymer is advantageous is in high performance liquid chromatography (HPLC), a commonly used technique for separating and quantifying the constituents of a mixture. HPLC is often used to separate chemicals and biological molecules that have very similar properties and are difficult if not impossible to separate by other conventional means. The major disadvantage of HPLC is, because the columns are packed with small porous beads, the high flow rates required to maximize the throughput in preparatory scale separations result in channeling of the solution around the particles, thereby degrading the separation. Since separation is a major cost of chemical processing, the development of high capacity monolithic columns could greatly reduce the cost of manufacturing pharmaceuticals and their precursors. The mesoporous polymers described herein may be prepared by polymerization within a suitable structure (e.g., a glass or metal tube) to form a stationary phase for chromatography.

Manufacture of Mesoporous Materials

In order to introduce larger pores into polymers and carbon, and thus increase its porosity, several groups have tried to form polymeric gels around liquid emulsions. This usually results in a mixture of pore sizes, and both the polymers and the carbons formed therefrom are mostly macroporous (>50 nm) rather than mesoporous (LeMay et al. 1990, Even and Gregory 1994). In an alternative approach, pyrolysis of aerogels prepared by supercritical fluid extraction of RF gels produces carbons with a mixture of meso- and micropores (Pekala et al. 1994), but because of the need for supercritical extraction, aerogels are very expensive to make. Hence, an effective method for producing a mesoporous carbon that does not involve supercritical extraction is particularly desirable.

On another front, since the invention of a new family of mesoporous silica materials, designated M41S, by scientists at Mobil Oil Corporation (Kresge et al. 1992, Beck et al. 1992), there have been numerous publications describing the use of surfactants to produce mesoporous metal oxides (Beck et al. 1994, Huo et al. 1994). This has dramatically expanded the range of pore sizes in metal oxides from the micropore to the mesopore regime. These mesoporous metal oxides are produced by gelation of metal alkoxides around a template made from micelles or liquid crystals formed by surfactants. Once the structure has formed, the surfactant is removed by high temperature oxidation, leaving a mesopore. The pore sizes can be adjusted by changing the length and the structure of the surfactants used. Cationic, anionic, and nonionic surfactants have been used to make a variety of mesoporous metal oxides (Luca et al. 1995).

Hence, it is desired to provide an improved mesoporous polymer and carbon structure. The desired polymer structure should be simple and inexpensive to manufacture and should have a high pore volume and a high fraction of mesopores. When intended for use as electrodes for ultracapacitors, the desired carbon structure should have high volumetric capacitance, high density, and high conductivity.

BRIEF SUMMARY OF THE INVENTION

The present invention comprises mesoporous materials that are suitable for use as catalyst supports, sorbents, and materials for separations. In electrical applications, the present carbons can be used as electrodes in double-layer capacitors. The present invention further comprises a method for making the novel mesoporous materials.

The present invention comprises polymer structures that have high mesoporosity, high density, and are simple and inexpensive to manufacture. The present invention also includes carbon structures having a relatively narrow pore size distribution in which the pores are large enough for the electrolyte solution to easily enter. Hence, the present carbon structures have high volumetric capacitance and high conductivity, and provide more wetted carbon surface in which a fully charged double layer can develop. The present monolithic carbons also offer increased density and conductivity as compared to compacts formed by pressing together a mass of carbon particles.

According to one preferred embodiment, a mesoporous polymer is formed by polymerizing resorcinol-formaldehyde (RF) and/or resorcinol-phenol-formaldehyde (RPF) in the presence of a cationic surfactant. It has been discovered the desired structures can be formed using a method of emulsion polymerization in which a phenol-formaldehyde polymer is formed around surfactant micelles. The size of the micelles controls the pore size of the material. It has been found that by adjusting the initial formulation, polymers and carbons having a narrow distribution of pore sizes can be prepared. More specifically, it is possible to produce pores with diameters ranging from 4 nm to micron size.

The polymer formed in this manner is pyrolyzed to give a porous carbon structure, which is then activated to increase the fraction of mesopores therein. The present method yields a mesoporous carbon that has many desired properties.

BRIEF DESCRIPTION OF THE DRAWINGS

For a more detailed description of the present invention, reference will now be made to the accompanying Figures, wherein.

DETAILED DESCRIPTION OF THE INVENTION

To address the shortcomings of the prior art, we have developed low-cost monolithic mesoporous polymers and carbons and a method for making same. The polymers are particularly useful as sorbents for liquid phase separations. While the present carbons can be used advantageously in a variety of applications, including in particular liquid phase, surface-limited reactions, they are particularly suited for use as thin film electrodes for use in ultracapacitors. These materials are made from inexpensive materials, and do not require expensive and time-consuming manufacturing processes.

Material Composition

According to a preferred embodiment, the present invention comprises polymerizing a suitable organic compound that is initially present as a microemulsion containing micelles of a surfactant. The resulting monolithic solid polymer is a porous solid with pores having a desirable size distribution range. Pyrolysis of said polymer produces a monolithic solid consisting primarily of elemental carbon, also having a desired pore size distribution and other desirable electrical properties.

The polymer preferably has pore sizes between 2–1000 nm, a density of 0.1 to 1.0 g/cc, and a surface area between 50–500 $m^2$/g. For purposes of experimentation, the well-known resorcinol/formaldehyde (RF) composition was used and is discussed below. One skilled in the art will understand that references herein to an RF system are exemplary only, and that the present invention can be practiced with a range of polymer systems, including but not limited to: hydroquinone/resorcinol/formaldehyde, phloroglucinol/ resorcinol/formaldehyde, catechol/ resorcinol/ formaldehyde, polyvinyl chloride, phenol/formaldehyde, epoxidized phenol/ formaldehyde, polyvinyl chloride, phenol/benzaldehyde, oxidized polystyrene, polyfurfuryl alcohol, polyvinyl alcohol, polyacrylonitrile, polyvinylidene chloride, cellulose, polybutylene, cellulose acetate, melamine/formaldehyde, polyvinyl acetate, ethyl cellulose, epoxy resins, acrylonitrile/styrene, polystyrene, polyamide, polyisobutylene, polyethylene, polymethyl-methacrylate, and divinylbenzene/styrene.

The surfactant is preferably any surfactant that is capable of stabilizing the electrostatic interactions between the monomer and surfactant. The surfactant may be cationic, anionic or nonionic depending on the polymer system in question. The best surfactant is related to the solvent, catalyst (if any) and monomers that are used. Examples of suitable surfactants include cetyltrimethylammonium chloride and cetyltrimethylammonium bromide (cationic), sodium dodecylbenzenesulfonic acid and sodium bis-2-ethylhexylsulfosuccinate (anionic), and Brij 30 (nonionic, poly-(ethyleneoxy) polar group).

Depending on the polymer, the preferred solution may also include an amount of a catalyst sufficient to catalyze the reaction within a desired period of time at the desired reaction temperature. Suitable catalysts include $Na_2CO_3$ for RF and AIBN (2,2'-azobisisobutyronitrile) for divinylbenzene/styrene.

Experimental Procedure

Figure 2:
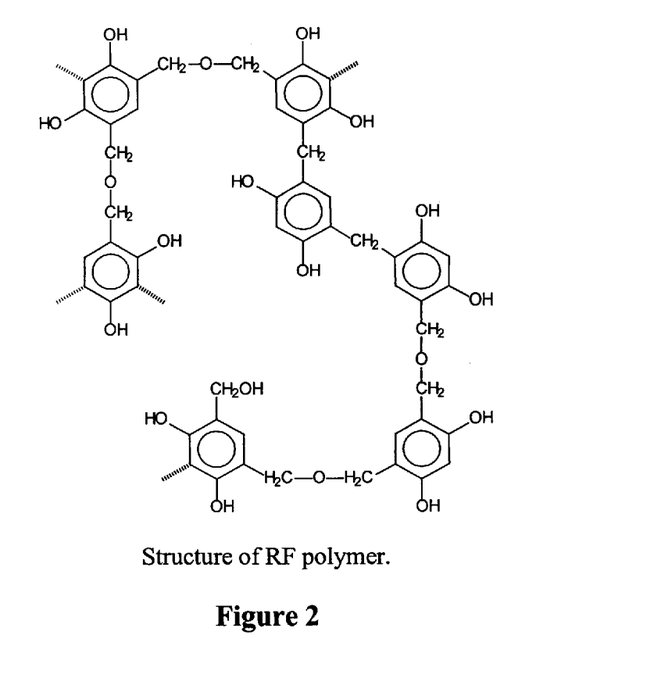
FIG. 2 is a schematic theoretical representation of the structure of an RF polymer.

To test the possibilities of using surfactants to introduce mesopores into monolithic carbon materials, RF gels were initially prepared in the presence of various surfactants. In this polymerization, resorcinol serves as a tri-functional monomer capable of adding formaldehyde in the 2, 4, and 6 positions of the ring. This monomer is particularly reactive because of the electron-donating effects of the attached hydroxyl groups. The substituted resorcinol rings condense with each other to form 30–200 angstrom clusters in solution. The size of the clusters is regulated by the catalyst concentration ($Na_2CO_3$) in the RF solution. The resulting structure is shown in FIG. 2.

The surfactants used for these experiments were cetyltrimethylammonium chloride (CTAC, cationic), the sodium salt of dodecylbenzenesulfonic acid (anionic), and Brij 30 (nonionic, poly-(ethyleneoxy) polar group). Only the cationic surfactant was effective with the preferred system.

The mole ratio of monomer, surfactant, and water was 10:1:560 as described for the preparation of metal oxides with nonionic surfactants (Bagshaw et al. 1995). The test procedure was to add to a tube with Teflon stoppers: water (8 mL), sodium carbonate (5 mg), surfactant (0.91 mmol), resorcinol (1.0 g, 9.1 mmol), and 37% formaldehyde in water (18.2 mmol). The tubes were stoppered and held at 90° C. for 3 days. The gels were dried in air at ambient temperature for 1 day, followed by 3 hours at 100° C.

After heating for 3 days, the CTAC gel was orange and opaque. Drying the gel did not shrink it noticeably. The dried gel was heated at 800° C. under a nitrogen atmosphere for 2 hours to carbonize the polymer and decompose the surfactant. The material shrank by approximately 40% but did not powder. The density of the product was 0.19 g/mL and the BET surface area was 467 $m^2$/g. The carbon material was analyzed by Hg porosimetry (Micromeritics, Norcross, Ga.). The median pore size was 2 μm and the porosity 86.5%. Although this material was largely macroporous (pore diameter >50 nm) the result nevertheless shows a potential for making porous carbons by this method. A control sample with no surfactant experienced considerable shrinkage during drying and carbonization for a density of 0.98 g/mL. The control sample also had a high surface area (500 m$^2$/g) but contained only micropores.

Following the success of the screening experiments using a surfactant to control pore sizes, various types of surfactant were contemplated. For example a nonionic surfactant (Brij 56) that has better solubility in water was tried and found to be no more effective than Brij 30. Since CTAC is commercially available only as an aqueous solution (25 wt.%), while CTAB (cetyltrimethylammonium bromide) is available as a pure solid, CTAB (cetyltrimethyl-ammonium bromide) was substituted for CTAC in some of the formulations in order to decrease the amount of water in the total formulation. Compounds formulated according to the preferred embodiment are therefore referred to herein as RF/CTA, where CTA is either CTAB or CTAC.

In the examples discussed below, the parameters varied were the ratio of surfactant, solvent, and catalyst to resorcinol. It has been shown that the ratio of monomer to catalyst significantly affects the density, surface area and mechanical properties of RF aerogels; therefore we examined monomer to catalyst (Na$_2$CO$_3$) ratios of 0.02 to 0.005 (Pekala et al. 1992). In our experiments, we found that in the presence of CTA, the higher catalyst concentration resulted in the formation of a precipitate; for this reason we maintained a catalyst/monomer molar ratio of 0.005 (5:1000). A preferred catalyst/monomer ratio is in the range of from about 0.001 to about 0.007. Elemental analysis of a sample carbonized at 500° C. was C=83.36%, H=3.61% and N=0.23% showing that most of the nitrogen was gone but a considerable amount of hydrogen remained. When the sample was carbonized at 900° C., the elemental analysis was C=95.44%, H=0.73%, and N=0.40% showing that the sample consisted mainly of carbon.

Figure 3:
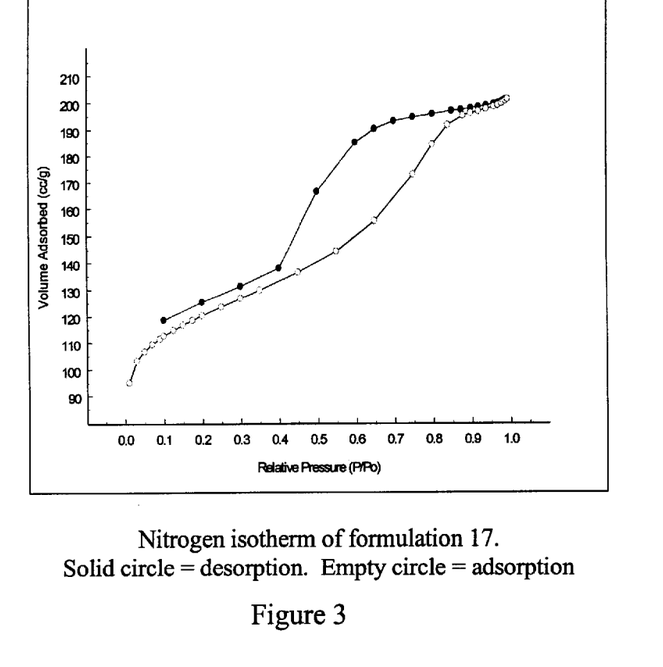
FIGS. 3 and 4 are plots of various properties of a mesoporous carbon formed in accordance with the present invention.
Figure 4:
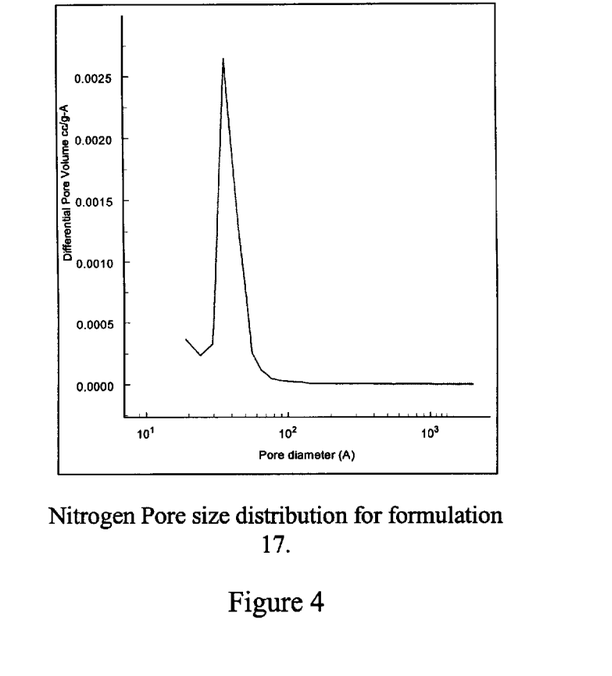

The specific surface area and the pore size distribution were analyzed by nitrogen adsorption on a Micromeritics Gemini instrument and by mercury porosimetry on a Micromeritics Autopore II 9220. FIG. 3 shows a representative isotherm using nitrogen as an adsorbate showing a type 4 isotherm that is characteristic for mesoporous solids (Gregg and Sing 1982). FIG. 4 shows typical pore size distribution data for our mesoporous carbons as calculated by the BJH method (Barrett ct al. 1951).

Examples

In the sample that follows we prepared resorcinol/formaldehyde polymer in an aqueous solution. Mixing the desired ingredients together in the presence of water formed the aqueous polymer solution. The polymer solution was then added to a glass mold that could be sealed to prevent evaporation. The solution was gelled by heating at 70° C. for 24 hours. The gelled polymer was removed from the mold and dried to remove the water. At this point the polymer can either be used as is, or the surfactant can be removed by washing with methanol, depending on the application. Because the present carbons are intended for use in ultracapacitors, the sample preparation method included an additional step in which the polymer was heated under an inert atmosphere (nitrogen or argon) to 1000° C. for 2 h at a ramp rate of 1° C./minute. This step carbonized the polymer and decomposed the surfactant as desired.

The samples produced in this manner were measured using conventional mercury porosimetry and nitrogen desorption techniques. Table 1 gives the measured values for the median pore diameter (MPD), total pore area (TPA), desorption pore diameter (DPD), desorption pore area (DPA), and BET surface area (BET), for twenty-five exemplary formulations.

Example

Using formulation #20 from Table 1 as an example, the steps followed in preparing each sample are as follows:

The polymer solution is added to a glass mold that can be sealed to prevent evaporation.

In sample #20, the solution has a composition in terms of moles of component per mole resorcinol:
2 moles formaldehyde as a 37 wt. % aqueous solution
0.005 moles Na$_2$CO$_3$ as a 0.4 M aqueous solution
0.06 moles CTAC as a 25 wt. % aqueous solution The solution is gelled by heating at 70° C. for 24 hours.

The polymer is removed from the mold and dried to remove the water. At this point the polymer can either be used as is or the surfactant can be removed by extracting the polymer with 2% HCl in EtOH.

To prepare the mesoporous carbons, the polymer is heated under an inert atmosphere (nitrogen or argon) to 1000° C. for 2 h at a ramp rate of 1° C./minute. This step carbonizes the polymer and decomposes the surfactant.

TABLE 1

Formulation and properties of TDA's RF/CTA porous carbons.

| | | | | Measured Properties | | | | |
|---|---|---|---|---|---|---|---|---|
| Sample | [1]Molar Ratios | | Density (g/cm$^3$) | [2]MPD (nm) | [3]TPA (m$^2$/g) | [4]DPD (nm) | [5]DPA (m$^2$/g) | BET (m$^2$/g) |
| | CTA | [7]H$_2$O | | | | | | |
| 1 | 0.10 | 56 | 0.19 | 2000 | 52 | | | 446 |
| 3 | 0.10 | 19 | 0.51 | 248 | 49 | | 67 | 446 |
| 4 | 0.10 | 14 | 0.62 | 139 | 62 | | 95 | 465 |
| 8 | 0.02 | 14 | 0.50 | 25 | 33 | 24 | 161 | 540 |
| 10 | 0.14 | 56 | 0.20 | 1612 | 10 | | 25 | 441 |
| 15 | 0.02 | 11 | 0.75 | 18 | 199 | 18 | 334 | 644 |
| 16[6] | 0.02 | 0 | 0.89 | 8 | 224 | 9 | 348 | 621 |
| 17[6] | 0.06 | 0 | 1.2 | 5 | 134 | 4 | 214 | 386 |
| 19 | 0.02 | 0 | 0.70 | 9 | 190 | 9 | 290 | 570 |
| 20 | 0.06 | 0 | 0.71 | 24 | 142 | 28 | 172 | 453 |
| 22 | 0.10 | 0 | 0.53 | 374 | 32 | | 97 | 501 |
| 23 | 0.03 | 0 | 0.80 | 13 | 162 | 10 | 312 | 653 |
| 24 | 0.04 | 0 | 0.80 | 16 | 143 | 11 | 301 | 661 |
| 25 | 0.05 | 0 | 0.78 | 23 | 99 | 12 | 218 | 580 |

Experimental Conditions:
[1]molar ratios are with respect to resorcinol (x/resorcinol), Na$_2$CO$_3$/resorcinol = 0.005, gelled at 95° C. for 1–4 days, carbonized at 800° C. for 2 h (1° C./min.) Hg porosimetry data:
[2]MPD = Median Pore Diameter (Volume)
[3]TPA = Total Pore Area
Nitrogen desorption data:
[4]DPD = Desorption Pore Diameter
[5]DPA = Desorption Pore Area
[6]CTAB instead of CTAC.
[7]Indicates the amount of additional water; does not include water present in original reagent solutions.

Samples using alkyl-trimethyl-ammonium surfactants were prepared in which the only the length of the alkyl chain of the surfactant. Table 2 shows how the length of the alkyl chain affects pore size of the carbon; longer alkyl chains result in larger pores.

TABLE 2

Effect of surfactant chain length on carbon pore size
(as determined by nitrogen desorption).

| Surfactant Chain Length $C_nH_{2n+1}(CH_3)_3N^+$ where n = | Pore Diameter (nm) |
|---|---|
| 12 | 13 |
| 14 | 16 |
| 16 | 18 |

Samples were also prepared in which the length of the alkyl chain was kept constant (hexadecyl) and the other substituents on the nitrogen were varied. Table 3 shows that different substituents on the nitrogen do affect the resultant pore size. The hexadecyldimethyl head group is the least sterically demanding because both hexadecyl substituents are directed into the micelle leaving only the two methyl groups; as expected this surfactant gives the smallest pores. From Table 3, it is observed that as the steric bulk of the head group is increased, the measured pore size of the carbon is also increased.

TABLE 3

Effect of head group substituents on the carbon pore size
(as determined by nitrogen desorption)

| Head Group of Hexadecyl Ammonium Surfactant | Pore Diameter (nm) |
|---|---|
| Hexadecyldimethyl | 16 |
| Trimethyl | 18 |
| Benzyldimethyl | 28 |
| Pyridinium | 39 |

Formulations in which a percentage of the resorcinol was replaced with phenol are shown in Table 4. It was found that up to 70% of the resorcinol content could be replaced with phenol. Beyond 70%, the solution does not gel properly resulting in precipitate formation. It appears that slightly more surfactant is needed for RPF carbons than is needed for the RF carbons in order to obtain the same pore size.

TABLE 4

Formulation and properties of RPF/CTA porous carbons.

| Sample | [1]Molar Ratios CTA | H$_2$O | Phenol (%) | Density (g/cm$^3$) | Pore diameter (nm) | BET (m$^2$/g) |
|---|---|---|---|---|---|---|
| 29 | 0.08 | 0 | 50 | 1.03 | 17 | 209 |
| 30 | 0.10 | 0 | 50 | 0.57 | 80 | 362 |
| 56 | 0.10 | 0 | 70 |  | 100 | 718 |

Experimental Conditions:
[1]molar ratios are with respect to phenol content (x/resorcinol + phenol), Na$_2$CO$_3$/resorcinol + phenol = 0.005, gelled at 50° C. for 1–3 days, carbonized at 1000° C. for 2 hours (1° C./min.).

We have also analyzed the structure of the polymer precursor to the carbons and found that the pores are approximately twice the size of those measured in the carbonized materials (Table 5). In the polymers, primarily the mesopores are present and the overall and mesoporous surface areas are the same. This is in contrast to the carbons, in which there are always some micropores produced due to gas evolution during carbonization.

TABLE 5

Properties of the RF/CTA polymers
(pre-carbonization)

| Sample | Pore diameter (nm) | BET (m$^2$/g) |
|---|---|---|
| 20 | 38 | 64 |
| 24 | 22 | 165 |

Figure 5:
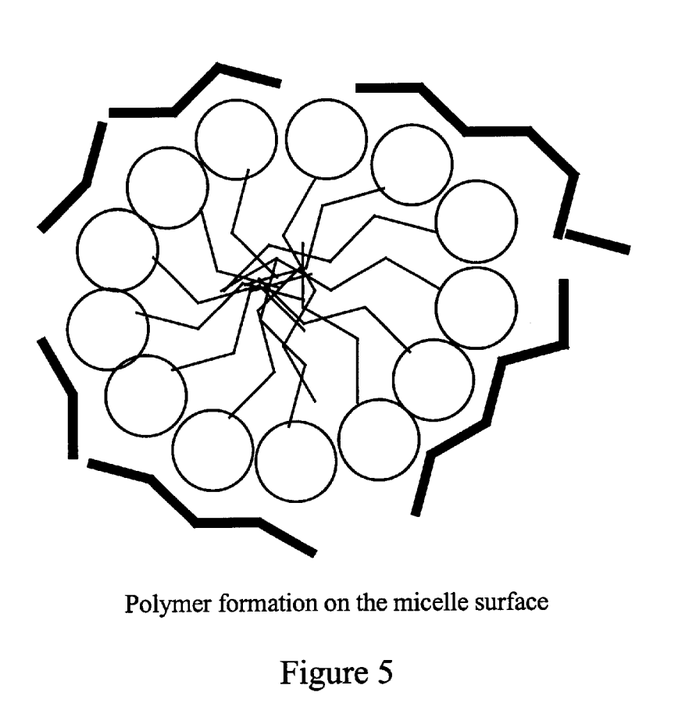
FIG. 5 is a schematic theoretical representation of polymer formation on a micelle surface.

For our work with divinylbenzene/styrene we did the polymerization in an organic solvent (toluene) rather than water, because the divinylbenzene (DVB) and styrene are not sufficiently soluble in water. Therefore, in these systems the pore formation will be around reverse micelles as shown in FIG. 5 (that is, the orientation of the surfactant is opposite to its orientation in water, with the ionic head group in the center of the micelle and the alkyl chains pointing out; Myers 1988). The surfactant that we used was sodium bis-2-ethylhexylsulfosuccinate (AOT), since this surfactant readily forms stable reverse micelles (Kurumada et al. 1996).

In this system styrene and divinylbenzene (1:1 molar ratio) in toluene were polymerized with a free radical initiator (AIBN), surfactant (AOT) and heat (Dhal and Khisti 1993). After polymerization, the polymer was washed with methanol to remove the surfactant and any unreacted monomer, and then dried. In this case we found that the polymers with and without AOT had a high surface area (530 and 313 m$^2$/g respectively) but the polymer without AOT had a broad range of pore sizes varying from 10 nm to micropores, whereas the polymer prepared with AOT had a sharp peak centered at 28 nm. We also prepared polymers without any added solvent (toluene). In this case the polymer with AOT had a surface area of 13 m$^2$/g and pore size of 15 nm, while the polymer without AOT had a surface area of 0.8 m$^2$/g and no measurable pores. We did not prepare carbons of DVB/styrene polymers because they decompose upon heating, although it should be possible to form carbon if they are heated in air at 220° C. before pyrolysis.

In another system, we prepared carbons from polyvinylidene chloride (PVDC). Once again we prepared the polymer in an organic solvent using AOT as the surfactant. The general procedure was to dissolve vinylidene chloride, the free radical initiator AIBN with a initiator/substrate molar ratio of 0.0028 and various surfactant/substrate molar ratios of AOT in toluene (2.5 mL). The solution was purged with argon for 5 minutes and then heated at 55° C. for 24 hours. During this step the a powdery white solid was formed. The polymer was then carbonized at 1000° C. for 2 hours (ramp rate 1° C./min). As expected the polymer prepared without any AOT (Sample 7) did not show any pores in the mesopore range. The addition of AOT did add mesoporosity to the carbon with a sharp peak centered at 3.8 nm. In conclusion, our approach of adding a surfactant to PVDC formulations to add mesoporosity to the resulting carbon was successful.

A problem with PVDC/AOT is that it is a powdery solid and not suitable for preparing monolithic carbons. In order to produce monolithic carbons, divinylbenzene (DVB) was added to the solution as a crosslinking agent. The addition of 10% DVB to the solution resulted in white homogeneous solids. Unfortunately, pyrolysis of this material resulted in the loss of the DVB component. The reason for this is that DVB does not form a char and instead decomposes upon heating. To overcome this problem, the polymer was heated in air at 220° C. for 16 hours before carbonization. This step stabilized the polymer structure and successfully produced a mesoporous monolithic carbon (Jenkins and Kawamura 1976).

Formation Mechanism

The pore size of the materials was mainly controlled by the surfactant concentration used in the formulation. This observation is in contrast to phenomena observed in studies relating to mesoporous metal oxides. In mesoporous metal oxides, the concentration of the surfactant to monomer can be varied over a large range without affecting the resulting pore sizes (Beck et al. 1992; Bagshaw et al. 1995). In addition, varying the chain length of the surfactant can modify pore sizes in the present invention.

According to the present invention, it is possible to prepare carbons having pore sizes ranging from mesoporous (4 nm) to macroporous (2000 nm), depending on the formulation. We observed that the RF gels with small pore sizes (samples 16 and 17) were transparent, indicating that the pores formed during polymerization were smaller than the wavelength of visible light (200–800 nm), whereas the gels of large pore carbons were opaque. The overall surface area (BET) is always greater than the liquid accessible surface area (>2 nm) as measured by nitrogen adsorption (DPA) and Hg porosimetry (MPD), indicating the presence of micropores formed by gas evolution during the carbonization process. From the data, we find that the amount of water and surfactant have the greatest effect on the pore sizes. Generally, the pore sizes decrease as we use less water and less surfactant, although this is not true in every case (see 16 and 17). When the molar ratio of surfactant to resorcinol is <0.2, the surfactant is no longer effective in controlling the pore size.

Hence, the present invention provides an inexpensive route to high surface area monolithic mesoporous polymers. This technique also allows control over the pore size of the resultant carbon in the mesopore range, a result that has not been possible with previous methods.

Activation

To further increase the surface area of the materials, the samples can be activated. When samples are activated, they are heated at high temperature, most commonly in the present of carbon dioxide, steam or aqueous base (Kinoshita 1988). This is a known method for preparing high surface area carbons. As discussed above, increasing the surface area of the carbon structure improves the efficacy of the material in a variety of applications, including sorbent, catalysis, and electrical applications. Carbon dioxide reacts with free carbon sites ($C_f$) according to the equation:

$$CO_2 + C_f \rightleftharpoons CO(g) + (CO)$$

The surface complex (CO) desorbs as CO leaving a new free carbon site.

$$(CO) \rightarrow CO(g) + C_f$$

Oxidation by carbon dioxide can increase the microporosity and surface area of the carbon, but the nature of the carbon precursor determines to a large extent the final pore texture. For relatively nonporous carbons, such as graphites, only a small increase in surface area is evident, with an increase in burnoff due to the unavailability of pores that provide additional surface area. For a carbon such as the present mesoporous carbons, which contain fine pores, the surface area increases dramatically with $CO_2$ activation.

This new surface area is only exposed by the gaseous activation and is not created by it.

Three of the present RF carbon formulations were activated with $CO_2$. They contained molar ratios of CTAC/resorcinol of 0.02 (sample 19), 0.04 (24) and 0.06 (sample 20) respectively. After pyrolysis, the samples were activated in carbon dioxide at 850° C. or 900° C. The porosity measurements showed that the median pore size pattern did not change, but the total surface area and the mesopore surface area have increased considerably. Table 6 shows how the surface area of the present mesoporous carbon stricture increases after being heated in $CO_2$.

TABLE 6

Comparison of the properties of RF/CTA carbon.

| Sample | $CO_2$ Activation Temperature (° C.) | BET Surface Area (m²/g) | Mesopore Surface Area (m²/g) | Pore Diameter (nm) |
|---|---|---|---|---|
| 24 | no activation | 524 | 150 | 28 |
| 24 | 850 | 891 | 211 | 28 |
| 24 | 900 | 1361 | 377 | 28 |
| 20 | no activation | 503 | 82 | 75 |
| 20 | 850 | 947 | 130 | 75 |
| 19 | no activation | 543 | 223 | 11 |
| 19 | 850 | 1081 | 340 | 11 |

Figure 6:
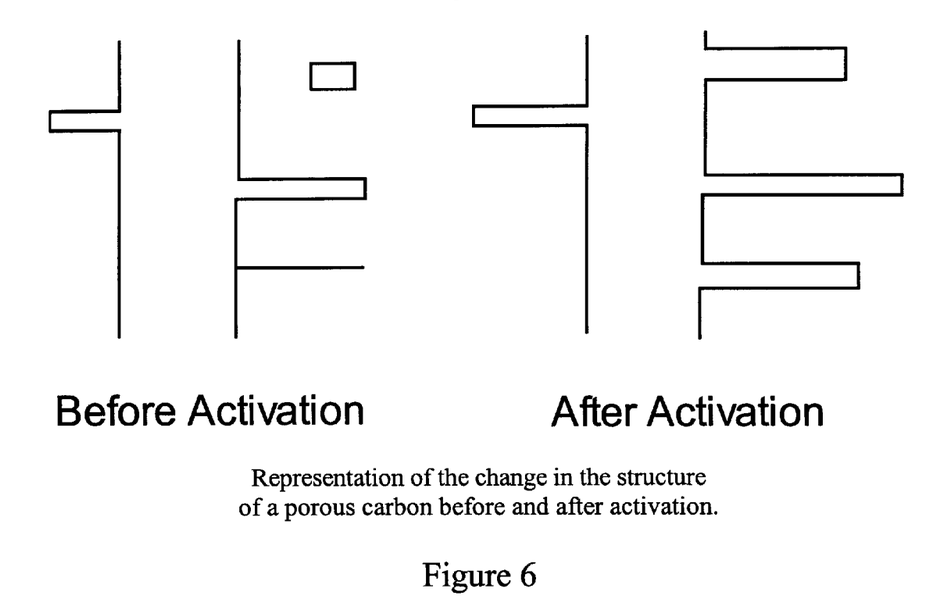
FIG. 6 is a representation of the change in the structure of a porous carbon before and after activation.

The reason that the mesopore diameter does not measurably increase during activation is that, to a first approximation, both the micropores and mesopores are etched away at the same rate during activation. Hence, the removal of a few layers of carbon in the mesopores will not result in a significant increase in the pore size (e.g. 28 nm to 28.5 nm), while increasing the pore diameter of a micropore from 1 nm to 1.5 nm is a significant increase. In addition, activation can open up closed pores and extend the length of existing pores, as illustrated in FIG. 6.

As described in the next section, activation by carbon dioxide results in a dramatic increase in capacitance, which is likely due either to increased accessibility to the micropore surface area or to changes in the surface properties of the carbon, or a combination of the two.

Figure 7:
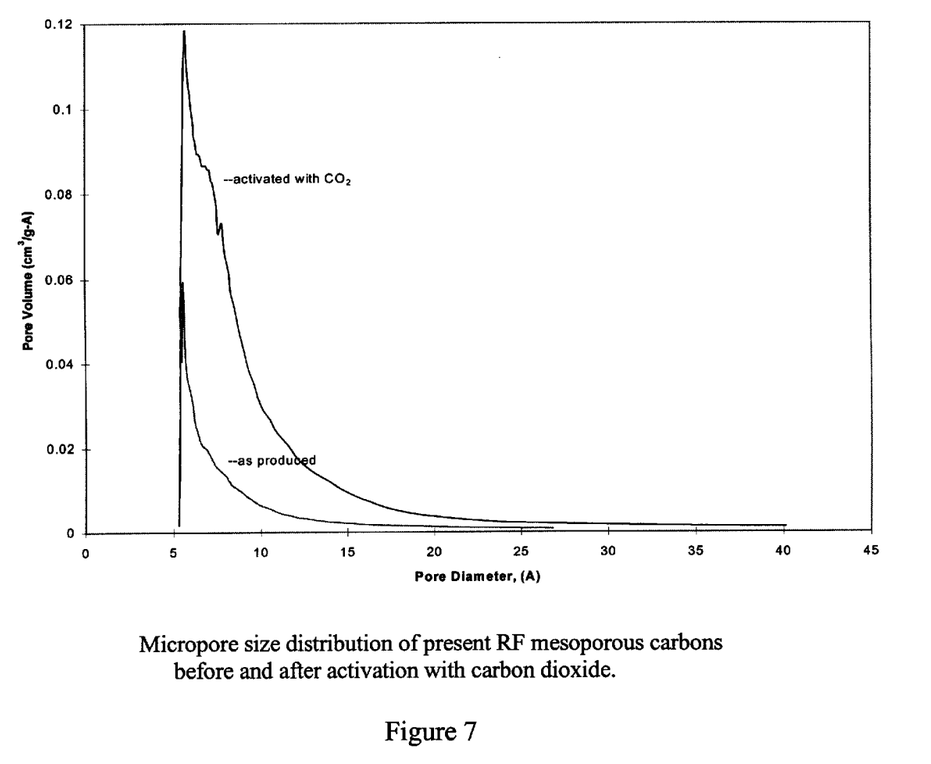
FIG. 7 is a plot of micropore size distribution of present RF mesoporous carbons before and after activation with carbon dioxide.

To support this hypothesis, one of the present RF carbon samples was sent to Micromeritics to measure the micropore size distribution before and after activation on their ASAP2010 instrument. In FIG. 7, the micropore size distribution of one of the present RF carbons as produced is compared with the micropore size distribution after activation with carbon dioxide. The range of the instrument is limited to 5 angstroms (indicated by the sharp cutoff of the peaks), but from the shoulder that we can see, the micropore distribution has been expanded from a limit of approximately 12 angstroms to about 20 angstroms. From this data we believe that the dramatic increase in capacitance that observed in the present samples after activation is due to the increase in the micropore size and surface area.

Testing Methods

Figure 9:
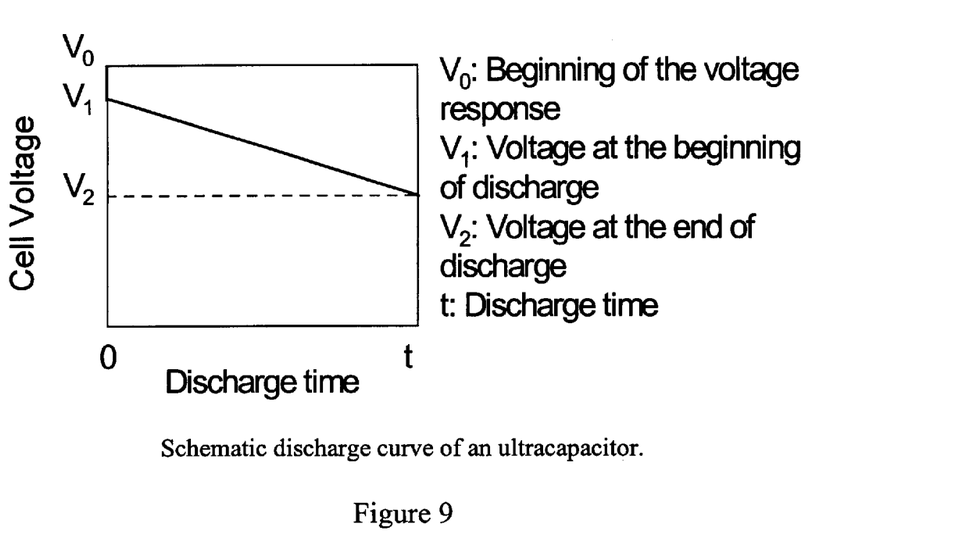
FIG. 9 is a schematic discharge curve of an ultracapacitor.

The present activated and unactivated mesoporous carbons were screened by measuring their capacitance and generating a charge discharge curve for each in aqueous and nonaqueous electrolytes. A typical discharge curve is shown in FIG. 9. The charge discharge curves for the present films were obtained by applying a constant current pulse and following the voltage response with time using a VersaStat potentiostat, manufactured by EG&G of Oak Ridge Tennessee, interfaced to an IBM-compatible computer.

EG&G Model 270 software was used for application of the waveform function and data acquisition. The capacitance was measured in farads (F) and the cell resistance in ohms from the charge/discharge curve according to known procedures (Burke and Miller 1992) and the following equation:

$$C=It/(V_1-V_2)$$

The internal resistance (ER) is evaluated from the initial voltage drop $(V_1-V_0)$ as expressed by equation $$ER=(V_0-V_1)/I$$

The charge/discharge curves are an efficient way to quickly measure the capacitance of porous carbons and are routinely used to measure double-layer capacitance. To compare the performance of different samples, this value is divided by either the volume (F/cm³) or the mass (F/g) of the sample.

Capacitance Results for RF Carbons

In Table 7, gravimetric (F/g), and volumetric (F/cc) capacitance ($C_d$) of the present unactivated carbons in 4 M KOH are tabulated. In addition, the density, pore diameter, and BET surface area of our different carbon formulations are given and compared to the values for carbon aerogels and woven carbon fibers (Tran et al. 1996). Our best data in 4 M KOH is 116 F/g for the RF carbon and 80 F/g for the RPF carbon. The capacitance is tabulated for an individual electrode or half-cell because this is the usual and accepted practice in most of the relevant literature. That is, since we are using two identical pieces of carbon as the anode and the cathode it would be more technically accurate to divide the given capacitance by the weight or volume of the pair (which would cut the reported values in half), but this approach would not be consistent with usual practice in the industry. The weight values are for the dry electrode, i.e. the weight of the electrolyte is not included.

TABLE 7

Capacitance values for RF/CTA carbons in 4 M KOH.

| Sample | $C_d$ (F/g) | $C_d$ (F/cc) | Density (g/cm³) | Pore Diameter (nm) | BET Surface Area (m²g) |
|---|---|---|---|---|---|
| 1 | 60 | 12 | 0.19 | 2000 | 446 |
| 8 | 52 | 26 | 0.50 | 55 | 540 |
| 15 | 102 | 77 | 0.75 | 18 | 644 |
| 16 | 25 | 23 | 0.89 | 9 | 621 |
| 17 | 16 | 19 | 1.2 | 4 | 386 |
| 19 | 90 | 63 | 0.70 | 9 | 570 |
| 20 | 116 | 82 | 0.71 | 28 | 453 |
| 22 | 76 | 40 | 0.53 | 374 | 501 |
| 23 | 103 | 82 | 0.80 | 10 | 653 |
| 24 | 110 | 88 | 0.80 | 11 | 661 |
| 25 | 100 | 78 | 0.78 | 12 | 580 |
| 29 | 80 | 82 | 1.03 | 17 | 209 |
| 30 | 75 | 43 | 0.57 | 80 | 362 |
| 56 | 68 | | | 100 | 718 |
| CA[1] | 70 | 52 | 0.74 | 3 | 600 |
| ACFC[1] | 80 | 22 | 0.27 | <3 | 1690 |

CA = carbon aerogel, ACFC = carbon fiber cloth. [1](Tran et al. 1996)

Figure 8:
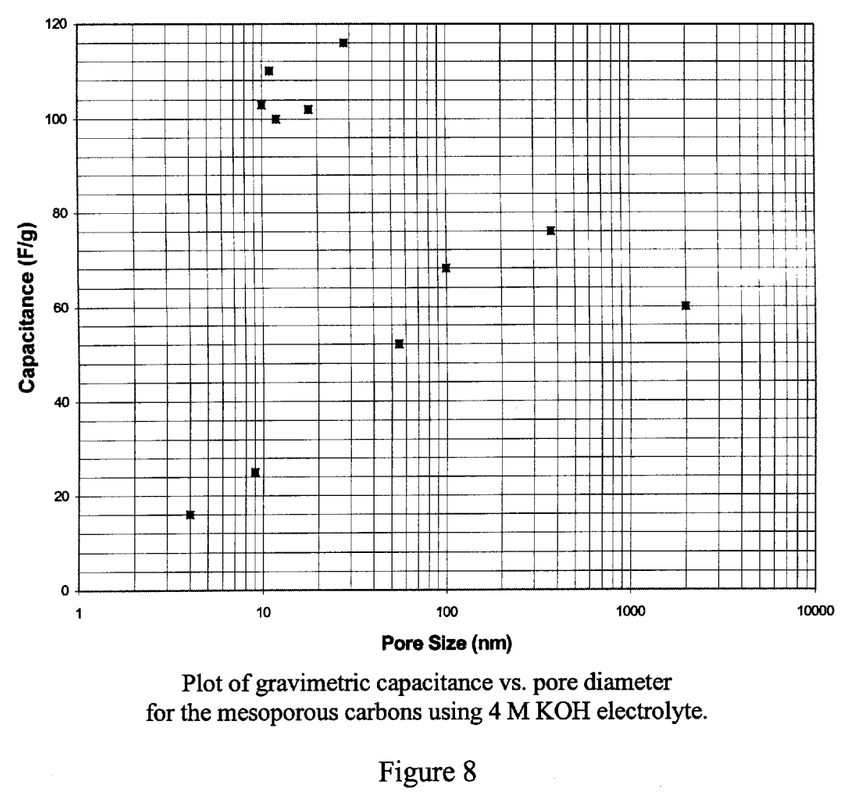
FIG. 8 is a plot of gravimetric capacitance vs. pore diameter for the mesoporous carbons using 4 M KOH electrolyte.

From this data, a number of observations can be made. First, a comparison of the capacitance of our best materials versus the theoretical double-layer capacitance shows that essentially all of the surface area is accessible. That is, for a carbon with a specific surface area of 500 m²/g, the theoretical capacitance of the electrode if all of the surface area is electrochemically active is 100 F/g, and several of our samples (20, 23, 24, 25) are at or close to the theoretical number. Second, a comparison of the mesopore diameter versus the overall capicitance shows a strong correlation. As shown in FIG. 8, as the pore size is increased from 4 nm to 28 nm the capacitance increases and above this value begins to drop off. This clearly shows that the mesopore content and size dramatically influences the double-layer capacitance of porous carbon electrodes and the optimum pore diameter appears to be between 10 and 30 nm for aqueos KOH interestingly, the capacitance of the carbon is more strongly influenced by the size of the mesopores rather than the overall surface area of the material. Since these mesopore sizes are much greater than necessary for the electrolyte to enter the pores, it is believed that the large mesopores allow easier ion transport.

A comparison of our materials with data for carbon aerogels and woven carbon fibers shows that TDA's carbon outperforms these carbons in gravimetric capacitance because of the size of the pores. Our electrodes also have considerable volumetric capacitance advantage over conventional carbon fiber and particulate carbon electrode because our carbons are much denser. This can be especially important in applications where space can be at a premium.

We also tested some of our samples using 1 M $H_2SO_4$ as the electrolyte (Table 8) and found that the capacitance was improved over aqueous KOH. This was expected because most carbon samples give slightly better capacitance in sulfuric acid, but oxidation of the carbon and corrosion of the current collectors can be a problem, especially at higher voltages, requiring the use of expensive noble metals (Eisenmann 1995).

TABLE 8

Capacitance in 1 M sulfuric acid.

| Sample | $C_d$(F/g) | $C_d$(F/cc) |
|---|---|---|
| 8 | 82 | 39 |
| 20 | 135 | 88 |

Table 9 shows the capacitance data for the same RF/CTA formulations described in Table 8. The as-produced carbons showed relatively low capacitance in organic electrolytes (<10 F/g), but their capacitance increased dramatically upon activation with $CO_2$. The mesopore distribution varies from 11 to 75 nm between these three samples and the data indicate that the optimum pore size is within this range. A preferred range for the pore size is from about 15 nm to about 25 nm. The samples show similar gravimetric capacitance regardless of whether they are activated at 850 or 900° C. The main difference is that a higher activation temperature tends to lower the density (0.65 g/mL for 850° C. vs 0.50 g/mL for 900° C). Therefore, the sample activated at 850° C. gives a preferred balance of high capacitance and high density.

TABLE 9

Comparison of the capacitance of activated and non-activated mesoporous monolithic carbon

| Sample | $CO_2$ Activation Temperature (° C.) | Gravimetric Capacitance (F/g) | Volumetric Capacitance (F/cc) | BET Surface Area (m²/g) | Pore Diameter (nm) |
|---|---|---|---|---|---|
| 24 | No activation | 5 | 8 | 524 | 28 |
| 24 | 850 | 57 | 37 | 891 | 28 |
| 24 | 900 | 54 | 27 | 1361 | 28 |
| 20 | No activation | 1 | 1 | 503 | 75 |

TABLE 9-continued

Comparison of the capacitance of activated and non-activated mesoporous monolithic carbon

| Sample | $CO_2$ Activation Temperature (° C.) | Gravimetric Capacitance (F/g) | Volumetric Capacitance (F/cc) | BET Surface Area (m²/g) | Pore Diameter (nm) |
|---|---|---|---|---|---|
| 20 | 850 | 40 | 28 | 947 | 75 |
| 19 | No activation | 7 | 6 | 543 | 11 |
| 19 | 850 | 47 | 32 | 1081 | 11 |
| CA | No activation | 16 | 10 | 600 | 3 |
| ACFC | No activation | 40 | 12 | 1690 | <3 |

CA-Carbon aerogel
ACFC-activated carbon fiber cloth

If all of the surface area of the best sample (#24 activated at 850° C.) were electrochemically accessible, its theoretical capacitance would be about 180 F/g (based on surface area of 900 m²/g and a capacitance of 20 $\mu$F/cm²). An experimental value of 57 F/g was achieved, which indicates a 32% effective utilization of the surface area. Similar results have been obtained for PVDC derived carbons.

In Table 10, the results of the carbon electrodes prepared according to this invention are set out and compared those for other carbons that are currently being used in ultracapacitors, namely carbon aerogels developed at Lawrence Livemore National Laboratories, now being commercialized by PowerStor, and woven carbon fiber cloths. These results show that that the present materials exceed the performance of the prior art carbons. Not only does capacitance exceed that of the known carbon aerogels, but through the use of low-cost starting materials and elimination of the expensive supercritical extraction processing step, the present materials are considerably less expensive to produce. Also, because of the much greater densities possible for monolithic carbons, the volumetric energy density is much better than is possible with particulate carbon electrodes.

TABLE 10

Comparison of the capacitance of ultracapacitor electrodes (0.65 M NEt$_4$BF$_4$ in propylene carbonate).

| Porous carbon | Gravimetric Capacitance (F/g) | Density (g/cc) | Volumetric Capacitance (F/cc) |
|---|---|---|---|
| TDA | 57 | 0.65 | 37 |
| CA[1] | 16 | 0.62 | 10 |
| ACFC[1] | 40 | 0.30 | 12 |

Calculations are based on the dry weight of a single carbon electrode
CA = carbon aerogel,
ACFC = activated carbon fiber cloth.
[1](Tran et al. 1996)

Finally, we measured the conductivity of our porous carbons using the four probe van der Pauw method. The results and comparison to other carbons are shown in Table 11. As expected, the conductivity is not as good as non-porous carbons, but is considerably better than other highly porous carbons.

TABLE 11

Comparison of conductivity of carbons.

| Carbon Type | Conductivity (Scm⁻¹) |
|---|---|
| Graphite | 1400[1] |
| glassy carbon | 200[1] |
| TDA's porous carbon | 70 |
| carbon aerogel | 20[2] |
| Reticulated vitreous carbon | 0.7 |

[1]Kinoshita 1988,
[2]Lu et al. 1993

Capacitor Preparation

While the foregoing discussion discloses the formation of the present monolithic, high surface area carbon films in general, we have also prepared these materials as monolithic free-standing thin films. The present materials are ideal for double-layer capacitors because they have high conductivity, high surface areas, high mesoporosity and most importantly high capacitance. Very thin carbon electrodes give increased power because they allow more rapid transport of ions in and out of the carbon. Also, thin films can easily be packed into an array of electrodes to produce a compact device.

According to one preferred embodiment, thin films are prepared by casting the present polymer solution between two Teflon covered flat aluminum plates with a thin silicone gasket around the edges. After curing, the film can be cut into any desired shape with a high-speed blade or if the film is thin enough, it can be cut with a scissors. Using this procedure, after pyrolysis thin film carbon electrodes have been produced that are as thin as 200 microns.

Figure 10:
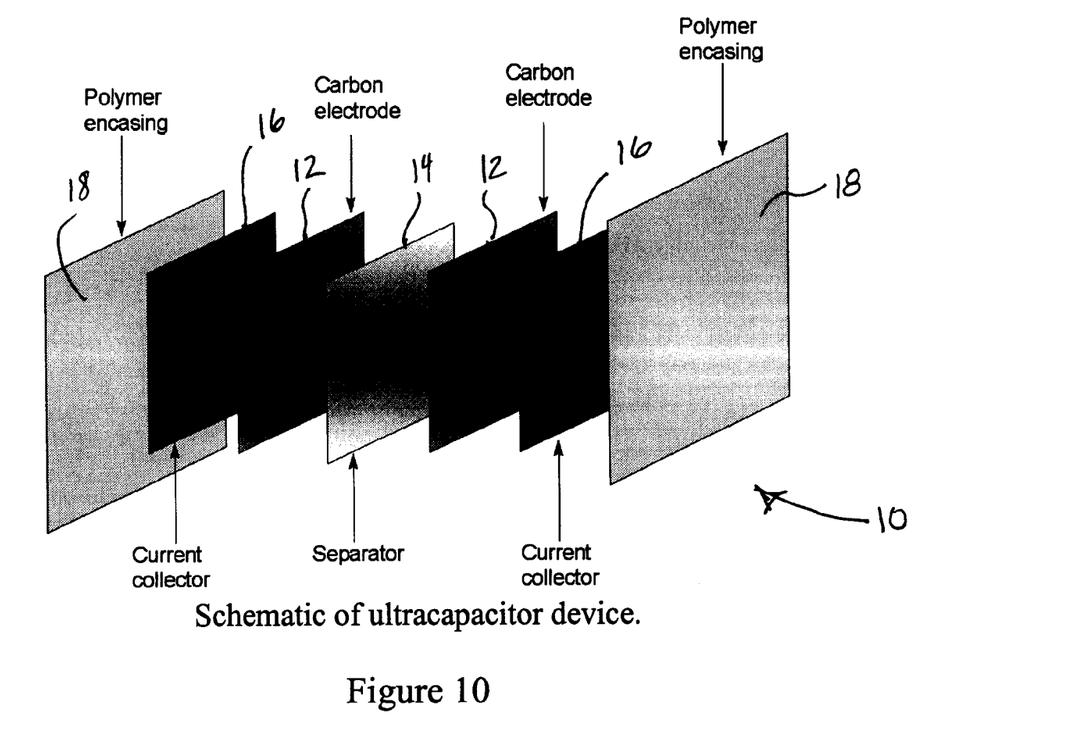
FIG. 10 is a schematic diagram of an ultracapacitor device.

The preferred thin film carbon electrodes can in turn be used in the assembly of a capacitor. For example, according to the preferred embodiment illustrated in FIG. 10, an ultracapacitor 10 consists of two or more pairs of the mesoporous carbon electrodes 12 separated by a porous, electrically insulating material 14. Current collectors 16 supply electrical contacts to the electrodes to provide electrical connection to the voltage source (not shown). The preferred carbon pore size will depend on the electrolyte that is used. The components are preferably sealed in a polymeric housing or package 18. An example of a suitable device comprises electrodes made from the present carbon film, a glass fiber paper separator, and aluminum foil current collectors, with a liquid electrolyte (0.65 M NEt$_4$BF$_4$ in propylene carbonate (PC)), sealed in a metallized film bag. After the electrodes, separator and electrolyte are placed in the bag, it can be sealed with an epoxy inside an argon filled glovebox.

Conclusions

In sum, the mesopores that are introduced by the present surfactant templating synthesis produce predominantly mesoporous polymers of any desired pore size by simply adjusting the initial formulation. These polymers can be pyrolyzed to produce monolithic carbons that contain mesopores that provide a passageway to the micropores that contain the surface area needed in a variety of applications. With the combination of surfactant templating and activation, it is possible to produce monolithic carbons with a desired pore size range.

Using the present technology, it is also possible to prepare monolith polymers with the desired pore size distribution of for high-throughput chromatography.

What is claimed is:

1. A method for preparing a mesoporous polymer, comprising the steps of:
   (a) providing a solution containing a polymerizable organic compound and a surfactant;
   (b) allowing the surfactant to form ordered structures in the solution; and
   (c) polymerizing the polymerizable organic compound to form a porous polymer having a BET surface area of at least about 50 $m^2/g$.

2. The method according to claim 1 wherein the solution is organic.

3. The method according to claim 1 wherein the solution is aqueous.

4. The method according to claim 1, further including the step of drying the porous polymer to produce a dried porous polymer.

5. The method according to claim 1, further including the step of removing surfactant from the porous polymer.

6. The method according to claim 1, further including the step of washing the porous polymer so as to remove the surfactant therefrom.

7. The method according to claim 1, further including the step of controlling pore size by controlling the amount of surfactant in the solution.

8. A method for preparing a mesoporous carbon, comprising the steps of:
   (a) providing a solution containing a polymerizable organic compound and a surfactant;
   (b) allowing the surfactant to form ordered structures in the solution;
   (c) polymerizing the polymerizable organic compound without impregnating said porous polymerizable organic compound into a graphitic body, so as to form a porous polymer; and
   (d) pyrolyzing the porous polymer to form a porous carbon.

9. The method according to claim 8, wherein step (d) comprises heating the porous polymer sufficiently to pyrolyze the polymer and remove surfactant therefrom.

10. The method according to claim 8, further including the step of activating the porous carbon so as to increase capacitance when used with an electrolyte.

11. The method according to claim 8, further including the step of activating the porous carbon, wherein the activation is carried out at between 500° C. and 1200° C.

12. The method according to claim 8, further including the step of controlling the composition of the solution so as to produce a mesoporous carbon having a pore size between about 4 nm and about 50 nm.

13. The method according to claim 8 wherein said porous carbon has a BET surface area of at least about 50 $m^2/g$.

14. The method according to claim 8, further including the step of controlling pore size by controlling the amount of surfactant in the solution.

15. A method for preparing a mesoporous polymer in the absence of a graphitic body, comprising the steps of:
   (a) providing a solution containing a polymerizable organic compound and a surfactant;
   (b) allowing the surfactant to form ordered structures in the solution; and
   (c) polymerizing the polymerizable organic compound to form a porous polymer having a BET surface area of at least about 50 $m^2/g$.

* * * * *